(No Model.)  2 Sheets—Sheet 1.

M. SCHINDLER.
ELECTRIC FURNACE.

No. 573,041.  Patented Dec. 15, 1896.

Witnesses:

Inventor:
Martin Schindler (No Model.) 2 Sheets—Sheet 2.

M. SCHINDLER.
ELECTRIC FURNACE.

No. 573,041. Patented Dec. 15, 1896.

Witnesses:

Inventor:
Martin Schindler

UNITED STATES PATENT OFFICE.

MARTIN SCHINDLER, OF NEUHAUSEN, SWITZERLAND.

ELECTRIC FURNACE.

SPECIFICATION forming part of Letters Patent No. 573,041, dated December 15, 1896.

Application filed April 23, 1896. Serial No. 588,708. (No model.)

*To all whom it may concern:*

Be it known that I, MARTIN SCHINDLER, a citizen of the Republic of Switzerland, residing at Neuhausen, Switzerland, have invented a certain new and useful Electric Furnace with Cooling-Conduits, of which the following is a specification.

My invention has relation to apparatus for melting or fusing substances by means of electricity. As is well known, in this class of apparatus when substances or compounds are to be melted or fused that require high temperatures those parts of such apparatus not made of refractory or fireproof materials, particularly the holders for the electrodes and the electrodes themselves, are very rapidly injured or destroyed, requiring frequent repairs or the substitution of new ones. On the other hand, the electrodes, usually of carbon, are liable to be consumed within their holders, whereby the contact between carbon and metal is partially, if not wholly, destroyed or interrupted, resulting in a comparatively great loss of electric energy, while in many cases the lower electrode, composed of carbon and metal, suffers to such an extent from the intense heat that the metal holder is melted, thereby completely breaking the electric circuit.

The object of my invention is to obviate the disadvantages above referred to by providing means for cooling the electrode holders or supports, and therethrough the electrodes, as will now be fully described, reference being had to the accompanying drawings, in which—

Figure 1:
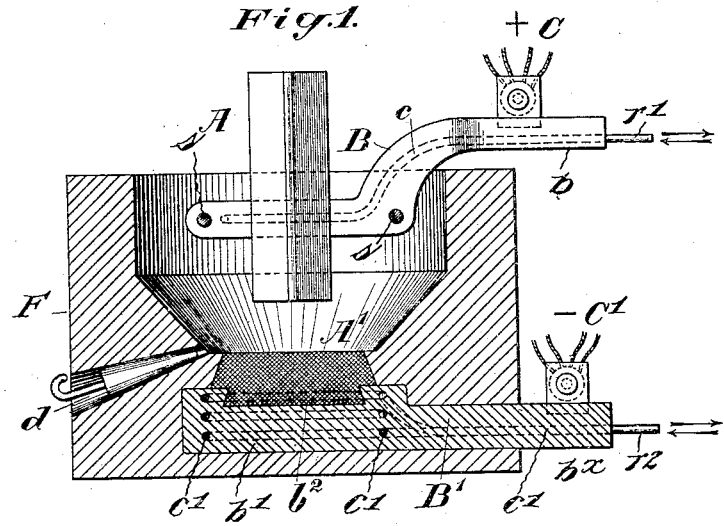
Figure 2:
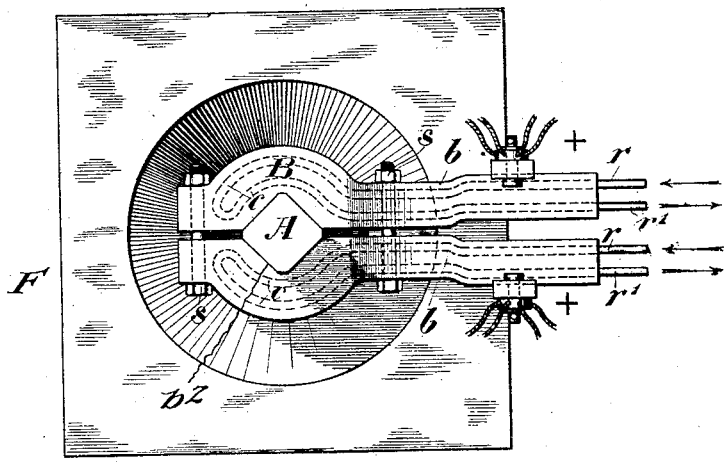
Figure 4:
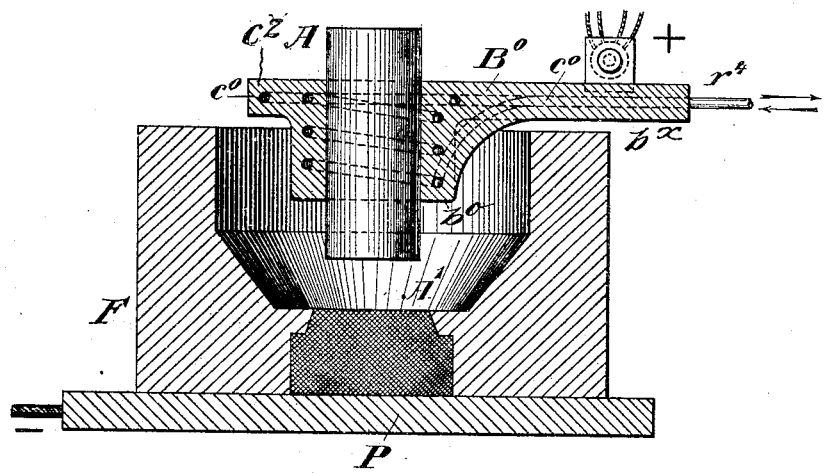
Figure 5:
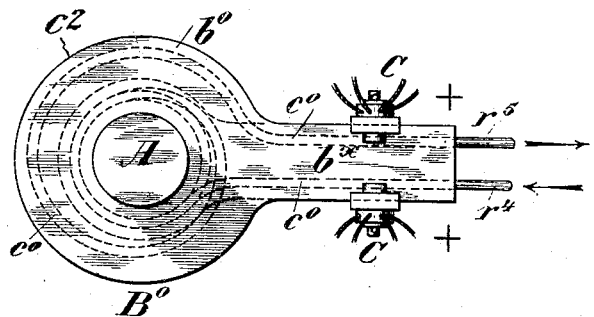
Figure 3:
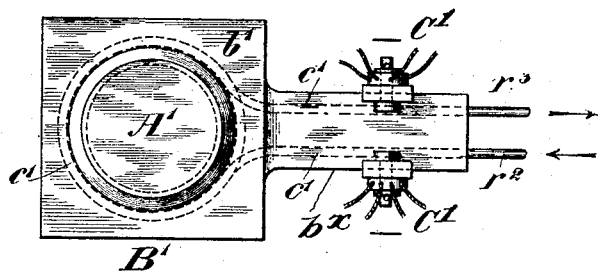

Figure 1 is a vertical section of an apparatus in which provision is made for cooling the holders of both electrodes. Fig. 2 is a top plan view thereof, and Fig. 3 is a like view of the lower-electrode holder detached. Fig. 4 is a vertical section of apparatus in which the holder for the upper or positive carbon electrode only is provided with means for cooling the same, and Fig. 5 is a top plan view of said holder.

The apparatus, namely, the furnace itself, may be of any desired form and fireproof construction, that illustrated in the drawings being a common form and chosen as an example only, and is or may be provided with a suitable tap-hole $d$, Fig. 1. In said Fig. 1 and in Fig. 2 I have shown the holder B for the upper or positive carbon electrode A as constructed of two parts, forming when bolted together a clamp in which the electrode is held, the two sections of the clamp being provided in the inner faces with a half-seat or bearing $b^2$ of a form to accommodate the electrode A, the shanks $b$ of said sections being provided with a suitable binding-post for the electric conductor or cable C. In each clamp-section are formed two passages that merge into each other at their inner ends to form a continuous passage $c$, having the general form in outline of said clamp-sections, said passages being connected by pipes $r$ and $r'$, respectively, with a source of supply of a suitable cooling agent, liquid or gaseous, preferably with a source of cold-air supply, and, for instance, with the atmosphere, so that an uninterrupted circulation of the cooling agent can be maintained during the operation of the apparatus.

The lower-carbon holder B' is shown in Figs. 1 and 3 as consisting of a square block of metal provided with a circular countersunk seat or recess having its encompassing wall undercut to better hold the lower or negative carbon electrode A', and said holder has a flat shank or extension $b^\times$, provided with suitable binding-posts for the electric conductor or cable C'.

As shown in Fig. 1, the holder B' has formed in its square body a spiral channel or passage merging into horizontal channels in the shank $b^\times$ to form a continuous passage or channel $c'$, connected by pipes $r^2$ and $r^3$, respectively, with a source of cold-air supply, and with the atmosphere, for instance.

In Figs. 4 and 5 I have shown a holder B⁰ for the upper or positive electrode A of substantially cylindrical form, provided with a rim or flange $c^2$, which, if desired, may be made of such width as to cover the upper open end of the furnace F. In this construction the holder is also provided with a continuous channel or passage winding spirally around the central cylindrical or cylindro-conical bearing for the electrode A, said passage extending also around the rim or flange $c^2$ of such holder and communicating with suitable channels in the flat shank $b^\times$ thereof, which latter channels are connected by pipes $r^4$ $r^5$, respectively, with a source of cold-air supply, and, for instance, with the atmosphere. In this construction the lower or negative electrode A' is embedded or seated in the lower portion of the furnace F and on a conductive plate P, the latter being sufficiently removed from the zone of combustion as not to require cooling.

It is of course understood that the described constructions of electrode-holders are merely given as examples in illustration of the application of my invention, which, as will be observed, is applicable to any other form of holder having sufficient body to form therein the circulation channel or passage.

It will further be understood that this invention is not limited to holders for electrodes arranged relatively to each other as described, as the poles may for certain purposes be reversed, as, for instance, in the production of carbids, in which it is immaterial whether the positive electrode is arranged above or below the negative electrode.

By providing means for cooling the electrode-holders said electrodes can be maintained at such a low temperature as not to become unduly heated at the points of contact with their metallic supports, hence cannot burn out at these points, as has been the case heretofore, the holder being also protected against the action of the intense heat resulting from the combustion of the electrodes in their holders.

Having thus described my invention, what I claim as new therein, and desire to secure by Letters Patent, is—

1. In apparatus for melting or fusing by electricity, a holder for the positive electrode consisting of a clamp composed of two independent sections, each provided with a half-seat or bearing for the electrode and with a continuous circulating channel or passage having inlet and outlet, and clamping-bolts for clamping said sections together, for the purpose set forth.

2. In apparatus for melting or fusing by electricity, a holder for the negative electrode consisting of a block of metal having a countersunk seat or bearing for such electrode, a flat shank and an internal continuous channel or passage around such seat having its inlet and outlet at the end of said shank, for the purpose set forth.

In testimony whereof I have hereunto signed my name, in the presence of two subscribing witnesses, this 23d day of March, 1896.

MARTIN SCHINDLER.

Witnesses:
EMIL BLUM,
H. LABBADY.